United States Patent
Ikeda et al.

[11] Patent Number: 5,974,663
[45] Date of Patent: Nov. 2, 1999

[54] METHOD OF MANUFACTURING CONNECTING ROD

[75] Inventors: Hideaki Ikeda; Toshikazu Murakami; Haruki Kodama; Yasutaka Matsue; Takao Shinohara, all of Saitama, Japan

[73] Assignee: Honda Giken Kogya Kabushiki Kaisha, Tokyo, Japan

[21] Appl. No.: 08/955,780

[22] Filed: Oct. 22, 1997

Related U.S. Application Data

[60] Provisional application No. 60/045,820, May 5, 1997.

[30] Foreign Application Priority Data

| Oct. 25, 1996 | [JP] | Japan | 8-284383 |
| Oct. 25, 1996 | [JP] | Japan | 8-284384 |
| Oct. 25, 1996 | [JP] | Japan | 8-284385 |

[51] Int. Cl.$^6$ .................................................. B23P 15/00
[52] U.S. Cl. .................................. 29/888.09; 29/888.092
[58] Field of Search ........................ 29/888.09, 888.091, 29/888.092; 225/101, 103

[56] References Cited

U.S. PATENT DOCUMENTS

| 3,994,054 | 11/1976 | Cuddon-Fletcher et al. . | |
| 4,191,238 | 3/1980 | Pichl | 29/888.09 |
| 4,216,682 | 8/1980 | Ban et al. | 29/888.09 |
| 4,569,109 | 2/1986 | Fetouh | 29/888.09 |
| 5,115,564 | 5/1992 | Miessen et al. | 29/888.09 |
| 5,169,046 | 12/1992 | Miessen et al. | 29/888.09 |
| 5,208,979 | 5/1993 | Schmidt . | |
| 5,274,919 | 1/1994 | Becker | 29/888.09 |
| 5,320,265 | 6/1994 | Becker | 29/888.09 |
| 5,353,500 | 10/1994 | Hoag et al. | 29/888.09 |
| 5,699,947 | 12/1997 | Cavallo et al. | 29/888.09 |

FOREIGN PATENT DOCUMENTS

| 07071438 | 3/1995 | Japan . |
| 07100576 | 4/1995 | Japan . |
| WO 96/24458 | 8/1996 | WIPO . |

*Primary Examiner*—Irene Cuda
*Attorney, Agent, or Firm*—Merchant & Gould P.C.

[57] ABSTRACT

An integral cast-iron connecting rod blank having a smaller-diameter end, a shank, and a larger-diameter end with a crank opening is set on an inclined base, and the tip end of a laser beam applying device is positioned in the larger-diameter end. While a YAG laser beam from the laser beam applying device is being applied to diametrically opposite inner central wall regions of the larger-diameter end, the laser beam applying device is moved to form notches transversely in the respective inner central wall regions. Two spreading elements are placed in the crank opening, and then a tapered wedge is inserted downwardly between the spreading elements. A downward impact point load is applied to a load bearing surface of the wedge thereby to apply spreading forces to the larger-diameter end. A crack starting radially outwardly from the notches is developed in the larger-diameter end, dividing the larger-diameter end into a saddle and a cap. Mating surfaces of the saddle and the cap have interfitting surface irregularities which prevent the saddle and the cap from being combined in wrong orientations. Before the larger-diameter end is split open, the crank opening is finished for roundness while the larger-diameter end is being subjected to the same load as a fastening load by which the saddle and the cap will be fastened by bolts.

9 Claims, 14 Drawing Sheets

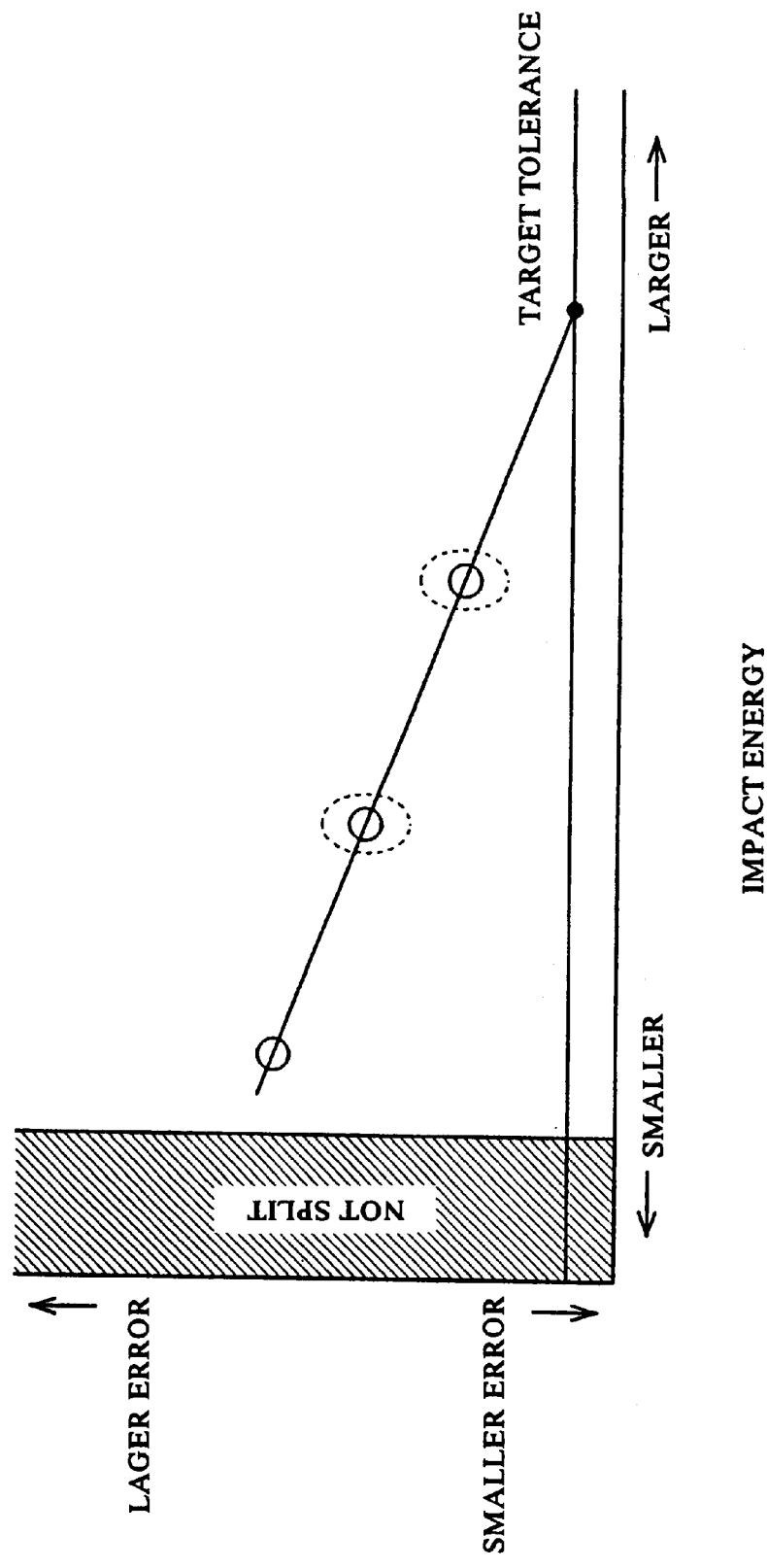

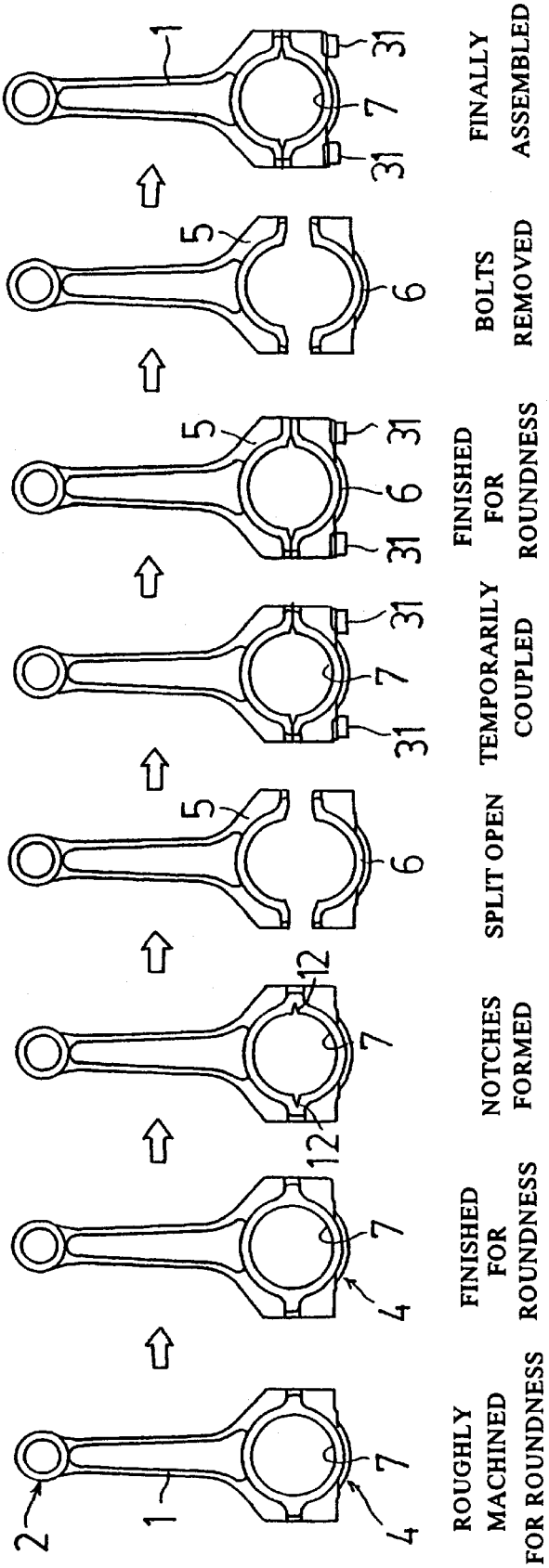

ROUGHLY MACHINED FOR ROUNDNESS → NOTCHES FORMED → TIGHTENED → FINISHED FOR ROUNDNESS → BOLTS REMOVED → SPLIT OPEN → FINALLY ASSEMBLED

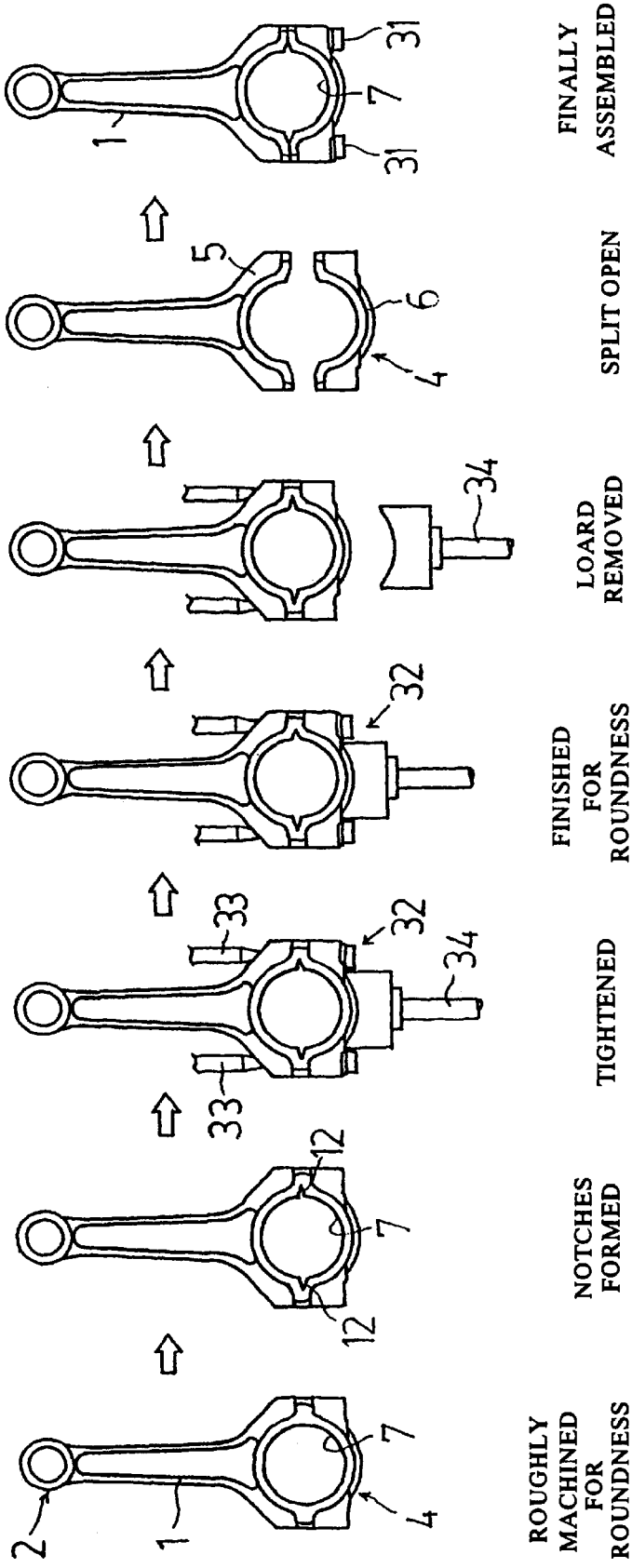

METHOD OF MANUFACTURING CONNECTING ROD

This application claims benefit of provisional application 60/045,820 filed May 5, 1997.

BACKGROUND OF THE INVENTION

1. Field of the Invention

The present invention relates to a method of manufacturing a connecting rod for use in internal combustion engines, and more particularly to a method of manufacturing a connecting rod having a larger end which comprises a semicircular saddle joined to a shank and a semicircular cap that is held against and coupled to the semicircular saddle through respective mating surfaces.

2. Description of the Related Art

Connecting rods of internal combustion engines comprise a smaller-diameter end for connection to a piston, a shank joined at one end thereof to the smaller-diameter end, and a larger-diameter end joined to the other end of the shank for connection to a crankshaft. The larger-diameter end has a semicircular saddle joined to the shank and a semicircular cap that is held against the semicircular saddle. The saddle and the cap have respective mating surfaces engaging each other, defining a circular crank opening which receives the crankshaft therein.

If the mating surfaces of the saddle and the cap are completely flat, then the cap held against the saddle tends to be shifted in position with respect to the saddle due to vibrations, allowing stresses to concentrate on a certain local region of the saddle and the cap.

The completely flat mating surfaces of the saddle and the cap are liable to prevent the saddle and the cap from being positioned accurately with respect to each other when they are assembled together, and may possibly lead to an inadvertent error in combining the saddle and the cap in wrong orientations. One conventional way of solving these problems has been to attach a positioning pin to one of the saddle and the cap and a hole defined in the other, so that the saddle and the cap will be positioned accurately with respect to each other and combined together in proper directions with the positioning pin received in the hole. However, the positioning pin adds to the number of parts required, and the entire number of steps of the manufacturing process is increased because the positioning pin is attached and the hole is defined.

According to other prior solutions disclosed in Japanese laid-open patent publications Nos. 7-71438 and 7-100576 and U.S. Pat. No. 3,994,054, interfitting surface irregularities are formed on the mating surfaces of the saddle and the cap.

Specifically, Japanese laid-open patent publication No. 7-71438 reveals a manufacturing process in which a connecting rod shank preform and a cap preform are set in a forging die with their mating surfaces facing each other, and then simultaneously forged to form interfitting surface irregularities on the mating surfaces due to a material flow developed while they are being forged.

According to the process disclosed in Japanese laid-open patent publication No. 7-100576, a connecting rod shank blank and a cap blank are separately extruded such that they will have mating surfaces including interfitting surface irregularities. These blanks are cut to a shank and a cap, which are then held against each other at their mating surfaces and then forged.

The method shown in U.S. Pat. No. 3,994,054 first forms an integral connecting rod having a smaller-diameter end, a shank, and a larger-diameter end by forging. Then, cracking openings having notches are defined respectively in opposite flange portions at the center of the larger-diameter end. Thereafter, tapered cracking pins are forced into the respective cracking openings preferably with an impact force, cracking the larger-diameter end into a saddle and a cap with surface irregularities on their mating surfaces.

The manufacturing process shown in Japanese laid-open patent publication No. 7-71438 is disadvantageous in that the shank preform and the cap preform need to be fabricated separately and it is cumbersome and time-consuming to set these preforms in the forging die.

Problems of the process disclosed in Japanese laid-open patent publication No. 7-100576 are that it is necessary to form the shank blank and the cap blank separately, and an extra step is needed to cut the shank blank and the cap blank to a shank and a cap, respectively.

According to the method disclosed in U.S. Pat. No. 3,994,054, surface irregularities may not necessarily be formed on the mating surfaces of the saddle and the cap. In the absence of surface irregularities on the mating surfaces, the saddle and the cap may possibly be shifted in position relative to each other and combined with each other in wrong orientations when they are assembled together. Furthermore, since the connecting rod is forged, the roughness of circumferential edges around the cracking openings is so large that the circumferential edges will be strained to a large extent when it is cracked by the cracking pins.

SUMMARY OF THE INVENTION

It is therefore an object of the present invention to provide a method of manufacturing a connecting rod for use in internal combustion engines, which has surface irregularities on mating surfaces of a saddle and a cap for preventing the saddle and the cap from being shifted in position relative to each other and combined together in wrong orientations, the method allowing such surface irregularities to be formed reliably without the danger of such a positional shift and wrong orientational combination, preventing the mating surfaces from being strained when they are forcibly separated under cracking forces, and being carried out relative simply with comparative simple equipment.

To achieve the above object, there is provided in accordance with the present invention a method of manufacturing a connecting rod, comprising the steps of preparing an integral cast-iron connecting rod blank having a smaller-diameter end, a shank, and a larger-diameter end, the larger-diameter end having a crank opening for receiving a crankshaft therein, applying a laser beam to opposite inner central wall regions of the larger-diameter end across the crank opening to form notches along the opposite inner central wall regions transversely of the integral cast-iron connecting rod blank, and applying forces to the larger-diameter end in a direction to spread the larger-diameter end to develop a crack radially from the notches in the larger-diameter end for thereby dividing the larger-diameter end into a saddle and a cap.

When the laser beam is applied to the opposite inner central wall regions, these regions change from pear-lite to cementite. Since the cementite structure is hard and brittle, when the larger-diameter end is subjected to spreading forces, a crack starts easily radially outwardly from the notches surrounded by the cementite structure, dividing the larger-diameter end into the saddle and the cap without causing substantial deformation to the saddle and the cap.

Because mating surfaces of the saddle and the cap have respective surface irregularities, the saddle and the cap can easily be positioned relative to each other and prevented from being assembled in wrong orientations and also from being positionally shifted after being assembled.

The crank opening in the larger-diameter end of the cast-iron connecting rod blank needs to be machined for roundness. Therefore, if the larger-diameter end is to be split into the saddle and the cap after the crank opening is machined for roundness, then it is necessary to form notches that are deeper than the thickness of a surface layer to be removed from around the crank opening by the machining for roundness.

At least one of the notches is of a zigzag shape as viewed from within the crank opening.

Inasmuch as at least one of the notches is of a zigzag shape, the mating surfaces of the saddle and the cap are distinctly different from each other, allowing the saddle and the cap to be positioned easily and preventing them from being assembled in wrong orientations and also from being positionally shifted after being assembled.

The notches have different shapes, respectively, as viewed from within the crank opening.

These differently shaped notches permit the mating surfaces of the saddle and the cap to be distinctly different from each other, also allowing the saddle and the cap to be positioned easily and preventing them from being assembled in wrong orientations and also from being positionally shifted after being assembled.

The laser beam is applied at different angles respectively to the opposite inner central wall regions of the larger-diameter end.

The laser beam applied at different angles respectively to the opposite inner central wall regions causes the larger-diameter end to be split in different directions on opposite sides of the crank opening. Therefore, the mating surfaces of the saddle and the cap are also distinctly different from each other, also allowing the saddle and the cap to be positioned easily and preventing them from being assembled in wrong orientations and also from being positionally shifted after being assembled.

According to the present invention, there is also provided a method of manufacturing a connecting rod, comprising the steps of preparing an integral connecting rod blank having a smaller-diameter end, a shank, and a larger-diameter end, the larger-diameter end having a crank opening for receiving a crankshaft therein, forming notches in opposite inner central wall regions of the larger-diameter end across the crank opening transversely of the integral connecting rod blank, inserting a pair of spreading elements in the crank opening, applying an impact point load to a central area of a wedge to drive the wedge between the spreading elements to spread the larger-diameter end radially outwardly for thereby dividing the larger-diameter end into a saddle and a cap.

The spreading elements are placed in the crank opening such that their outer surfaces are held in intimate contact with an inner surface of the crank opening, and the wedge is driven between the spreading elements, causing the spreading elements to divide the larger-diameter end into the saddle and the cap. Therefore, no local loads are applied directly to the inner surface of the crank opening, which is prevented from being damaged.

The integral connecting rod blank may comprise an iron casting, but may be made of any of various other materials. The notches may be formed by a wire cutting process, an ordinary machining process, a laser beam process, or the like.

The point load applied to the central area of the wedge is less liable to impose nonuniform loads on the wedge than a surface load applied thereto.

Since the impact load is applied to spread the spreading elements instantly, strains caused to the saddle and the cap are minimized, thus keeping a desired level of roundness for the crank opening.

The step of applying an impact point load comprises the steps of holding a load bearing surface of the wedge horizontally and dropping a spherical object from above the central area of the wedge downwardly onto the load bearing surface of the wedge for thereby applying the impact point load to the central area of the wedge.

Because the spherical object is dropped to apply the impact point load to the central area of the wedge, an apparatus used to apply the impact point load to the wedge is relatively simple in structure and can be manufactured relatively inexpensively.

The integral connecting rod blank comprises an iron casting, and the step of forming notches comprises the step of applying a laser beam to the opposite inner central wall regions of the larger-diameter end.

When the laser beam is applied to the opposite inner central wall regions, the regions change into a cementite structure around the notches, which allows the larger-diameter end to be split neatly from the notches without causing substantial strains to the saddle and the cap.

According to the present invention, there is further provided a method of manufacturing a connecting rod, comprising the steps of preparing an integral connecting rod blank having a smaller-diameter end, a shank, and a larger-diameter end, the larger-diameter end having a crank opening for receiving a crankshaft therein, forming notches in opposite inner central wall regions of the larger-diameter end across the crank opening transversely of the integral connecting rod blank, finishing the crank opening for roundness while the larger-diameter end is being subjected to a load which is the same as a fastening load by which a saddle and a cap divided from the larger-diameter end will be fastened to each other, and thereafter, applying forces to the larger-diameter end in a direction to spread the larger-diameter end to develop a crack radially from the notches in the larger-diameter end for thereby dividing the larger-diameter end into the saddle and the cap.

Inasmuch as the larger-diameter end is subjected to the load which is the same as the fastening load by which the saddle and the cap divided from the larger-diameter end will be fastened to each other, strains imposed on the larger-diameter end are substantially the same as those imposed when the saddle and the cap are fastened together. When the crank opening is finished for roundness while the larger-diameter end is being thus loaded, the roundness of the crank opening is kept within a target tolerance even though the crank opening is not finished for roundness after the larger-diameter end is divided into the saddle and the cap.

The larger-diameter end may be loaded by fastening bolts with a predetermined torque or some other device which applies a compressive force axially to the larger-diameter end.

The integral connecting rod blank may not be limited to an iron casting, but may be of any of various other materials, and the notches may be formed by a wire cutting process, an ordinary machining process, a laser beam process, or the like.

The larger-diameter end is being subjected to the load by a workpiece clamping jig which is used to clamp the larger-diameter end when finishing the crank opening for roundness.

At the same time that the connecting rod blank is positioned by the workpiece clamping jig, a compressive force is applied axially to the larger-diameter end by the workpiece clamping jig, thereby subjecting the larger-diameter end to the load which is the same as the fastening load by which the saddle and the cap will be fastened to each other while the crank opening is being finished for roundness. The method can thus be carried out relatively simply by relatively simple equipment.

The integral connecting rod blank may also comprise an iron casting, and the step of forming notches may also comprise the step of applying a laser beam to the opposite inner central wall regions of the larger-diameter end. When the laser beam is applied to the opposite inner central wall regions, the regions change into a cementite structure around the notches, which allows the larger-diameter end to be split neatly from the notches without causing substantial strains to the saddle and the cap.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 13 is a diagram of test results showing the relationship between the impact energy produced when the larger-diameter end of a connecting rod is cracked by a point load applied thereto and the roundness of the crank opening in the larger-diameter end of the connecting rod;

FIGS. 14(a) through 14(h) are views showing successive steps of a conventional process of producing a circular crank opening of a connection rod;

FIGS. 17(a) through 17(g) are views showing successive steps of another process of producing a circular crank opening of a connection rod according to the present invention.

DETAILED DESCRIPTION OF THE PREFERRED EMBODIMENTS

Figure 1:
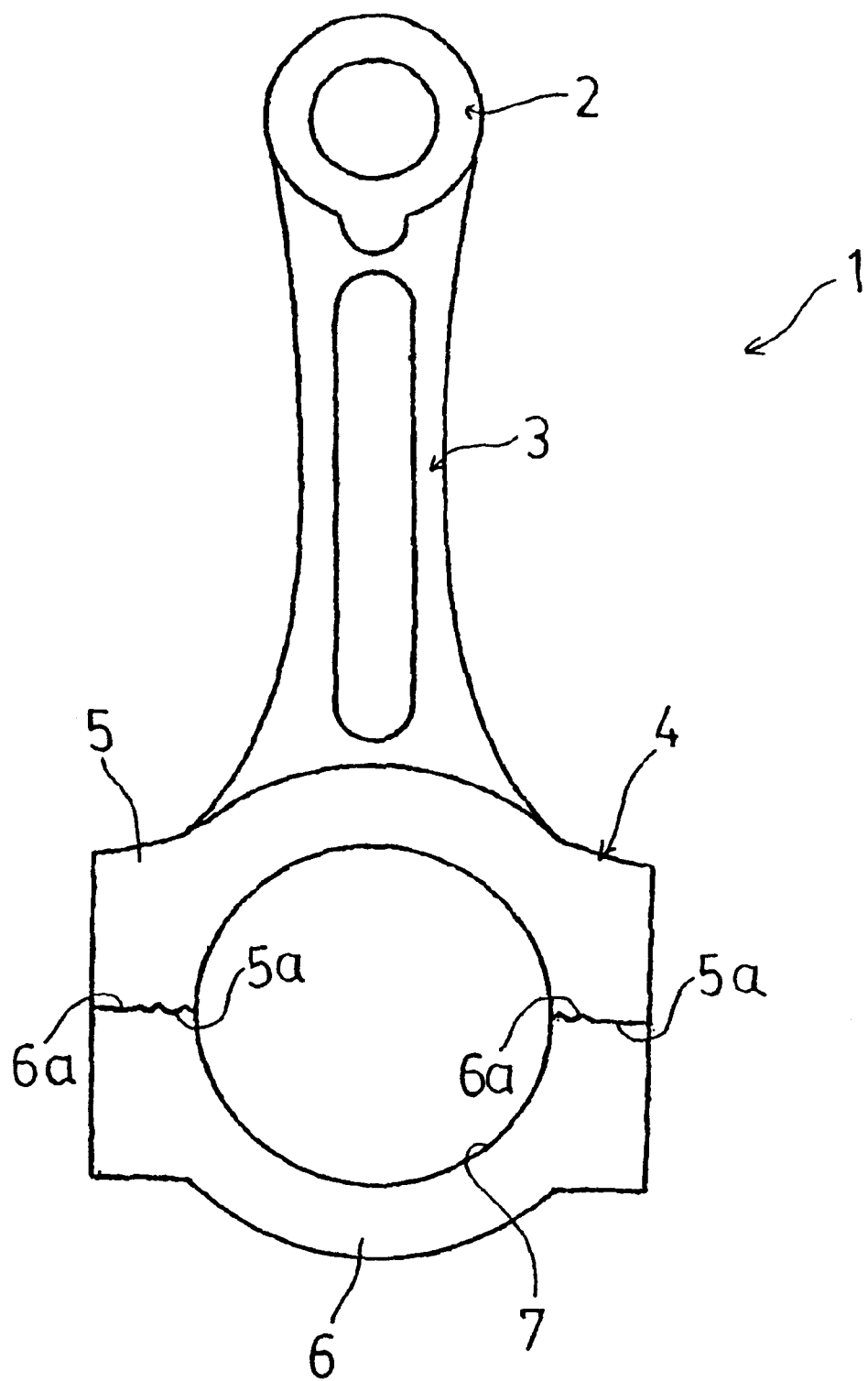
FIG. 1 is a plan view of a connecting rod manufactured by a method according to the present invention.

As shown in FIG. 1, a connecting rod 1 manufactured by a method according to the present invention generally comprises a smaller-diameter end 2 for connection to a piston (not shown), a shank 3 joined at one end thereto to the smaller-diameter end 2, and a larger-diameter end 4 joined to the other end of the shank 3 for connection to a crankshaft (not shown). The larger-diameter end 4 has a semicircular saddle 5 joined to the shank 3 and a semicircular cap 6 that is held against and fastened to the semicircular saddle 5 by bolts (not shown). The saddle 5 and the cap 6 have respective mating surfaces 5a, 6a engaging each other through surface irregularities thereof, defining a circular crank opening 7 which receives the crankshaft therein.

Figure 2:
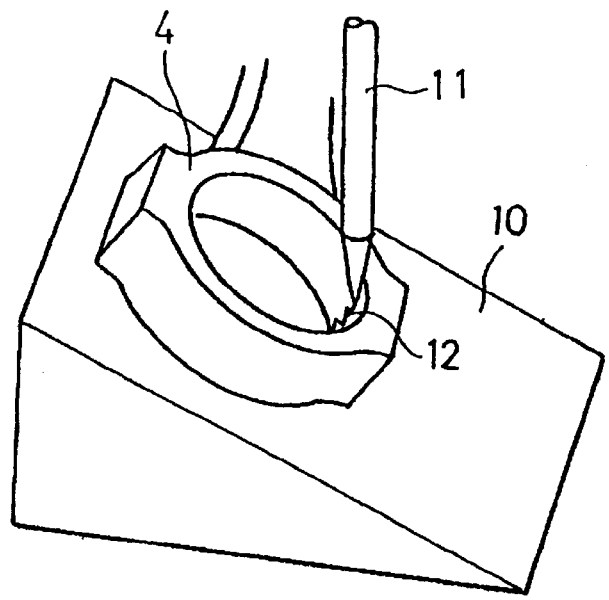
FIG. 2 is a fragmentary perspective view showing the manner in which a laser beam is applied to a larger-diameter end of the connecting rod.
Figure 3:
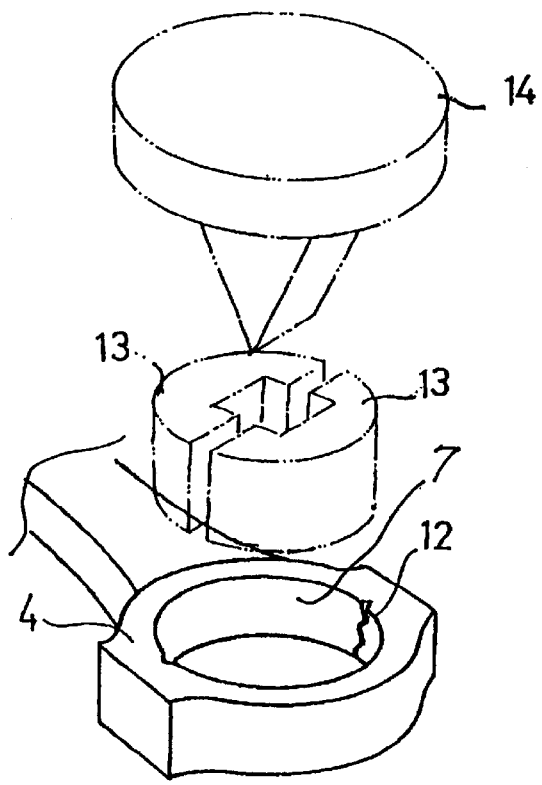
FIG. 3 is a fragmentary perspective view showing the manner in which the larger-diameter end of the connecting rod is cracked into a saddle and a cap.
Figure 4:
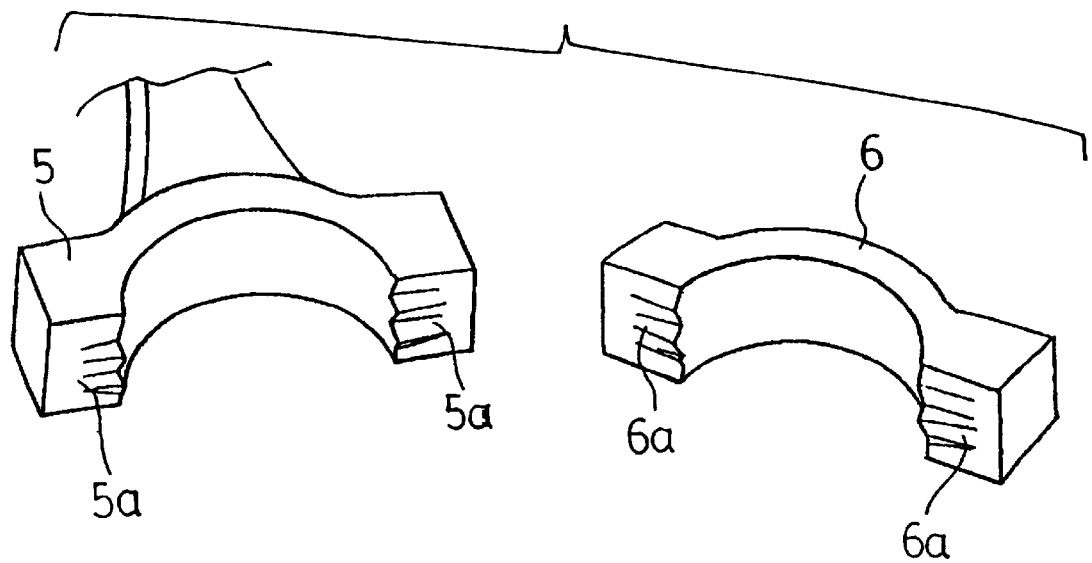
FIG. 4 is a fragmentary perspective view showing mating surfaces of the saddle and the cap.

A process of manufacturing the connecting rod 1 will be described below with reference to FIGS. 2 through 4.

First, an integral cast-iron connecting rod blank comprising a smaller-diameter end, a shank, and a larger-diameter end is produced by a casting process. Then, as shown in FIG. 2, the cast-iron connecting rod blank is set on an inclined base 10, and the tip end of a laser beam applying device 11 is positioned in the larger-diameter end 4. While a laser beam (YAG laser beam) emitted from the tip end of the laser beam applying device 11 is being applied to an inner central wall region of the larger-diameter end 4 on one side of the crank opening 7, the laser beam applying device 11 is moved to form a notch 12 in the inner central wall region of the larger-diameter end 4 in a transverse direction thereof. The notch 12 is shown as being of a zigzag or tortuous shape as viewed from within the crank opening 7.

In this manner, notches 12 are formed respectively in diametrically opposite inner central wall regions of the larger-diameter end 4 across the crank opening 7 in the transverse direction of the larger-diameter end 4. Then, as shown in FIG. 3, a pair of spreading elements 13 spaced axially of the cast-iron connecting rod blank is placed in the larger-diameter end 4 with their outer circumferential surfaces held in intimate contact with an inner circumferential surface of the circular crank opening 7. A downwardly tapered wedge 14 is then inserted downwardly between the spreading elements 13, and a downward load is applied to the wedge 14.

As a result, a crack starting radially outwardly from the notches 12 is developed in the larger-diameter end 4, separating the larger-diameter end 4 into the saddle 5 and the cap 6. At this time, the mating surfaces 5a, 6a of the saddle 5 and the cap 6 have interfitting surface irregularities.

If the cap 6 were combined with the saddle 5 in a wrong orientation, then the surface irregularities of the mating surfaces 5a, 6a would not fit together. Therefore, the saddle 5 and the cap 6 will always be combined with each other in proper orientations.

Figure 5:
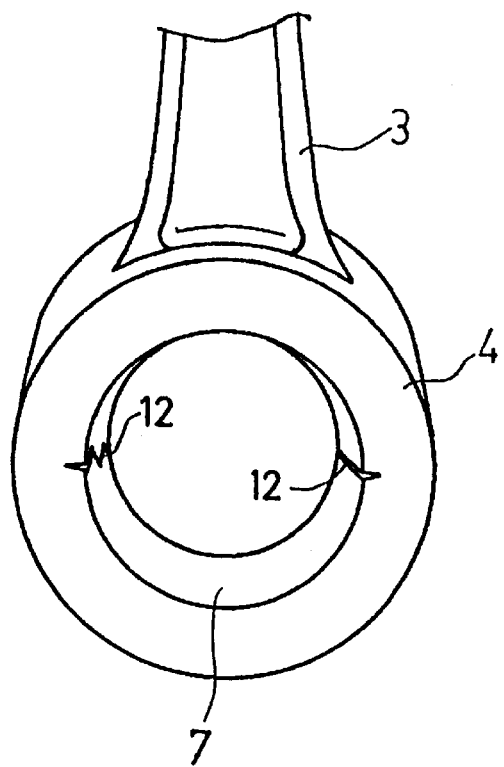
FIG. 5 is a fragmentary perspective view showing another pair of notches formed in the larger-diameter end of a connecting rod.
Figure 6:
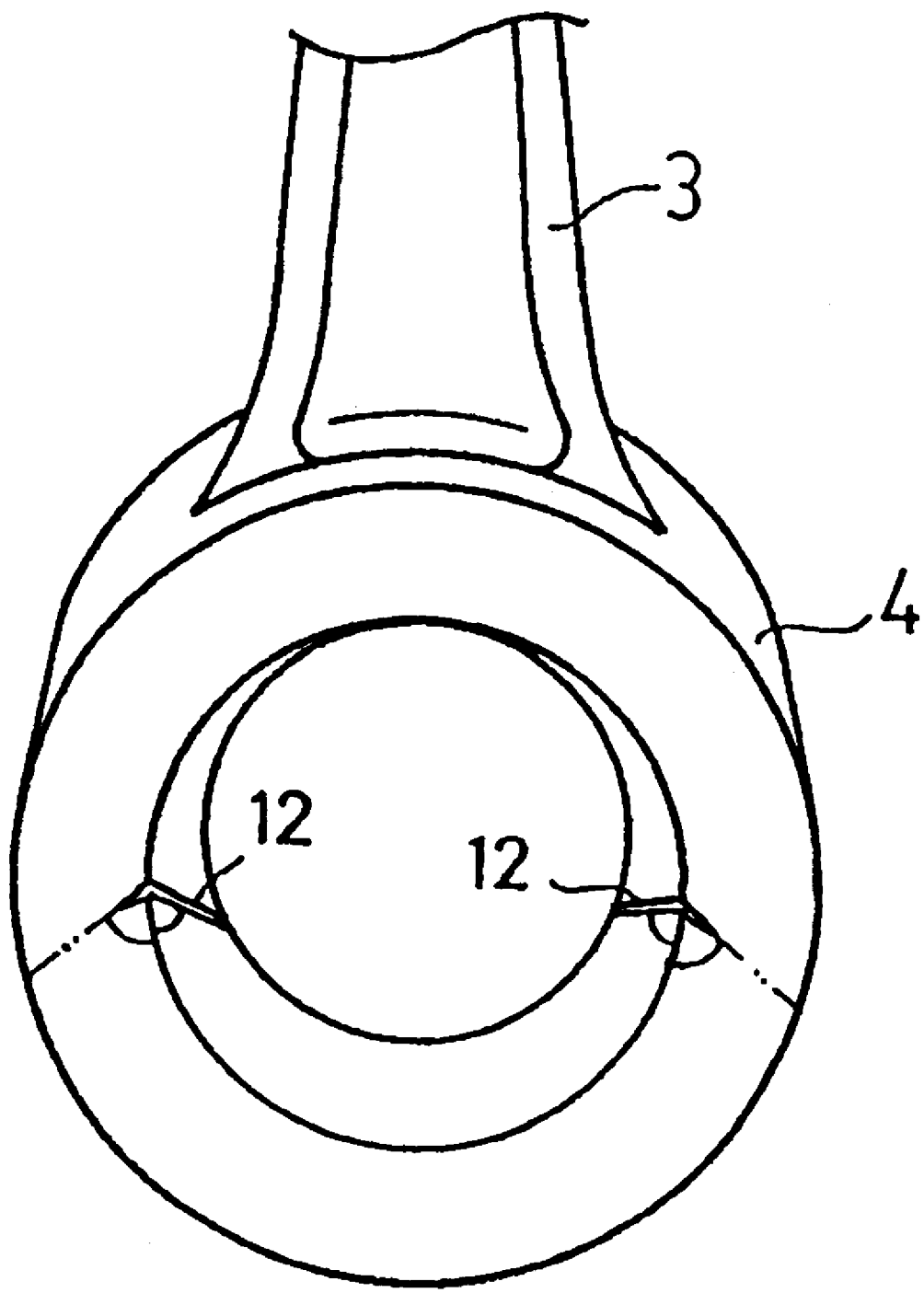
FIG. 6 is a fragmentary perspective view showing still another pair of notches formed in the larger-diameter end of a connecting rod.

FIGS. 5 and 6 show other pairs of notches 12 formed in the larger-diameter ends of connecting rods. In FIG. 5, the notch 12 formed in one inner central wall region of the larger-diameter end 4 is of a zigzag shape, whereas the notch 12 forming in the opposite inner central wall region of the larger-diameter end 4 is of a straight shape. In FIG. 6, both the notches 12 formed in the respective inner central wall regions of the larger-diameter end 4 are of a straight shape and are inclined at different angles to the axis of the larger-diameter end 4 by applying the laser beam at different angles to the inner central wall region of the larger-diameter end 4. The notches 12 shown in FIGS. 5 and 6 will develop different surface irregularities on the mating surfaces 5a, 6a when the larger-diameter end 4 is cracked into the saddle 5 and the cap 6.

Figure 7:
FIG. 7(a) is a microscopic representation of a metal structure of a notch formed in the larger-diameter end of a connecting rod by a laser beam.
FIG. 7(b) is a diagram showing the metal structure drawn on the basis of the microscopic representation shown in FIG. 7(a)
Figure 7:
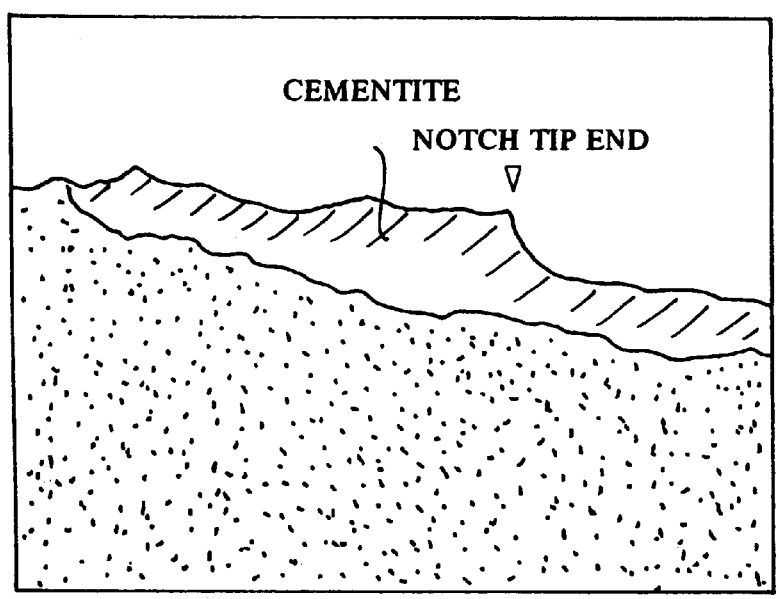
Figure 8:
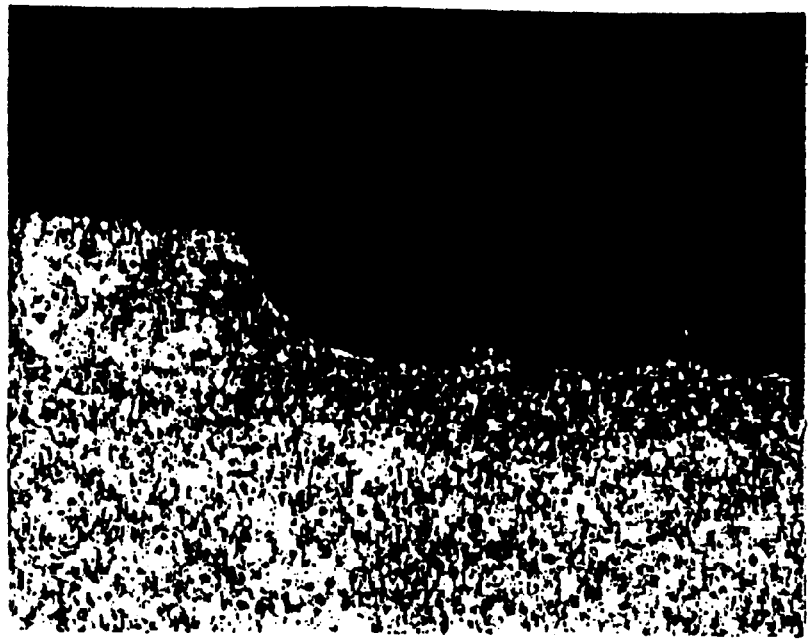
FIG. 8(a) is a microscopic representation of a metal structure of a notch formed in the larger-diameter end of a connecting rod by a wire cutting process.
FIG. 8(b) is a diagram showing the metal structure drawn on the basis of the microscopic representation shown in FIG. 8(a)
Figure 8:
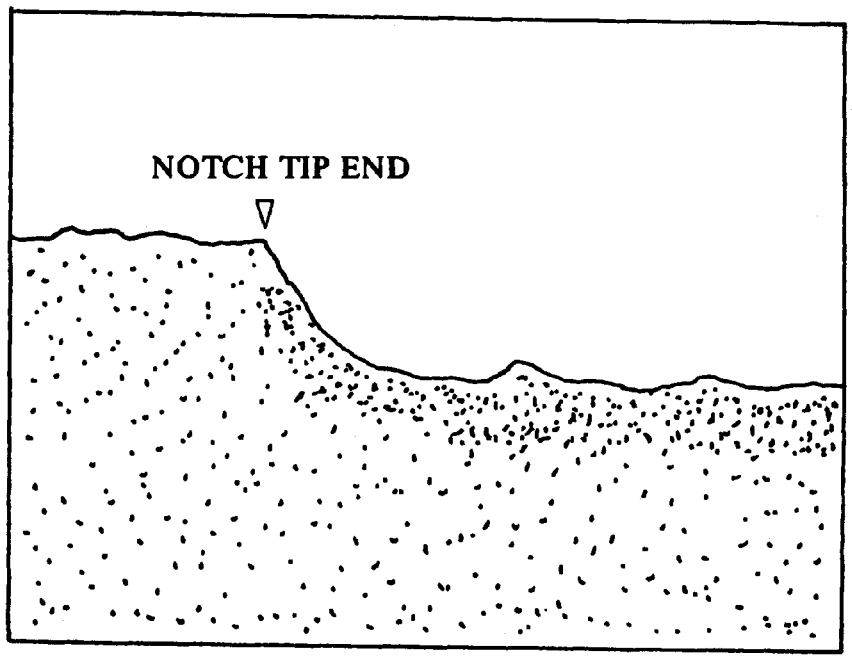

FIG. 7(a) is a microscopic representation of a metal structure of a notch formed in the larger-diameter end of a connecting rod by a laser beam, and FIG. 7(b) shows the metal structure drawn on the basis of the microscopic representation shown in FIG. 7(a). FIG. 8(a) is a microscopic representation of a metal structure of a notch formed in the larger-diameter end of a connecting rod by a wire cutting process, and FIG. 8(b) shows the metal structure drawn on the basis of the microscopic representation shown in FIG. 8(a). As shown in FIGS. 7(a), 7(b) and 8(a), 8(b), the metal structure of the notch formed by the wire cutting process has remained unchanged as a pearlitic structure, whereas the metal structure of the notch formed by the laser beam has changed into cementite at a surface layer of the notch and in a region that is considerably deep from a tip end of the notch.

Since the cementite structure is hard and brittle, it tends to be broken relatively easily when subjected to stresses.

Therefore, the cementite structure developed in the region that is considerably deep from the tip end of the notch is highly effective to determine the direction of a crack developed from the notches 12 in the large-diameter end 4.

The shape of cracked surfaces, i.e., the mating surfaces 5a, 6a, is essentially governed by the angle at which the notches 12 are formed with respect to the axis of the larger-diameter end 4. Consequently, the shape of the mating surfaces 5a, 6a can be controlled by varying the angle at which the laser beam is applied to the inner central wall regions of the larger-diameter end 4.

According to the process of manufacturing the connecting rod 1, as described above, an integral cast-iron connecting rod blank comprising a smaller-diameter end, a shank, and a larger-diameter end is produced by a casting process, and then a laser beam is applied to opposite inner central wall regions of the larger-diameter end to form notches of hard, brittle cementite transversely along the opposite inner central wall regions. When forces are applied tending to split open the larger-diameter end, a crack is developed from the notches in the larger-diameter end, separating the larger-diameter end into a saddle and a cap without causing substantial deformation of the larger-diameter end and hence the crank opening thereof.

A process of applying a load to the wedge 14 will be described below.

Figure 9:
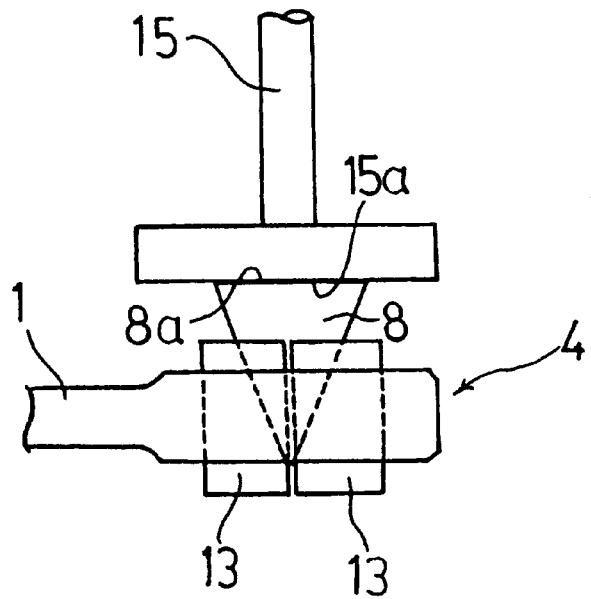
FIG. 9 is a view illustrative of the manner in which a surface load is applied to a load bearing surface of a wedge.
Figure 10:
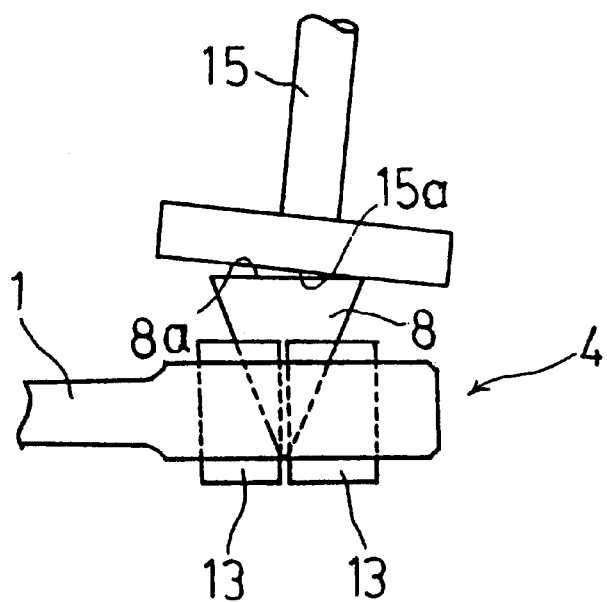
FIG. 10 is a view illustrative of a problem caused when the surface load is applied to the load bearing surface of the wedge.

There are available various processes of applying a load to the wedge 14. According to one process shown in FIG. 9, a pressing surface 15a of a presser 15 is held against a load bearing surface 8a of a wedge-shaped driver 8 inserted between the spreading elements 13 placed in the larger-diameter end 4, and forced downwardly by a press or the like to displace the spreading elements 13 away from each other, splitting open the larger-diameter end 4. The process shown in FIG. 9 causes no problem if the press remains highly accurate in operation. If the press suffers an undue amount of play between moving parts, causing the presser 15 to move in an undesirable direction, then the pressing surface 15a fails to make surface-to-surface contact with the load bearing surface 8a of the wedge-shaped driver 8, but is tilted to press an end of the load bearing surface 8a. When the pressing surface 15a presses the end of the load bearing surface 8a, it imposes a nonuniform force to the presser 8, which fails to split open the larger-diameter end 4 uniformly, but develops increased strains that tend to impair the roundness of the crank opening 7.

It has been found as a result of various tests that the roundness of the crank opening 7 becomes lower if the speed at which the load is applied to the driver 8 is smaller, in addition to the fact that a nonuniform force is applied to the presser 8.

FIG. 13 illustrates rest results showing the relationship between the impact energy produced when the larger-diameter end of a connecting rod is cracked by a point load applied thereto and the roundness of the crank opening in the larger-diameter end of the connecting rod. It can be seen from FIG. 13 that as the impact energy (kgf.m) increases, the roundness ($\mu$m) of the crank opening increases, and that the roundness is achieved within a target tolerance when the impact energy reaches a certain level.

Figure 11:
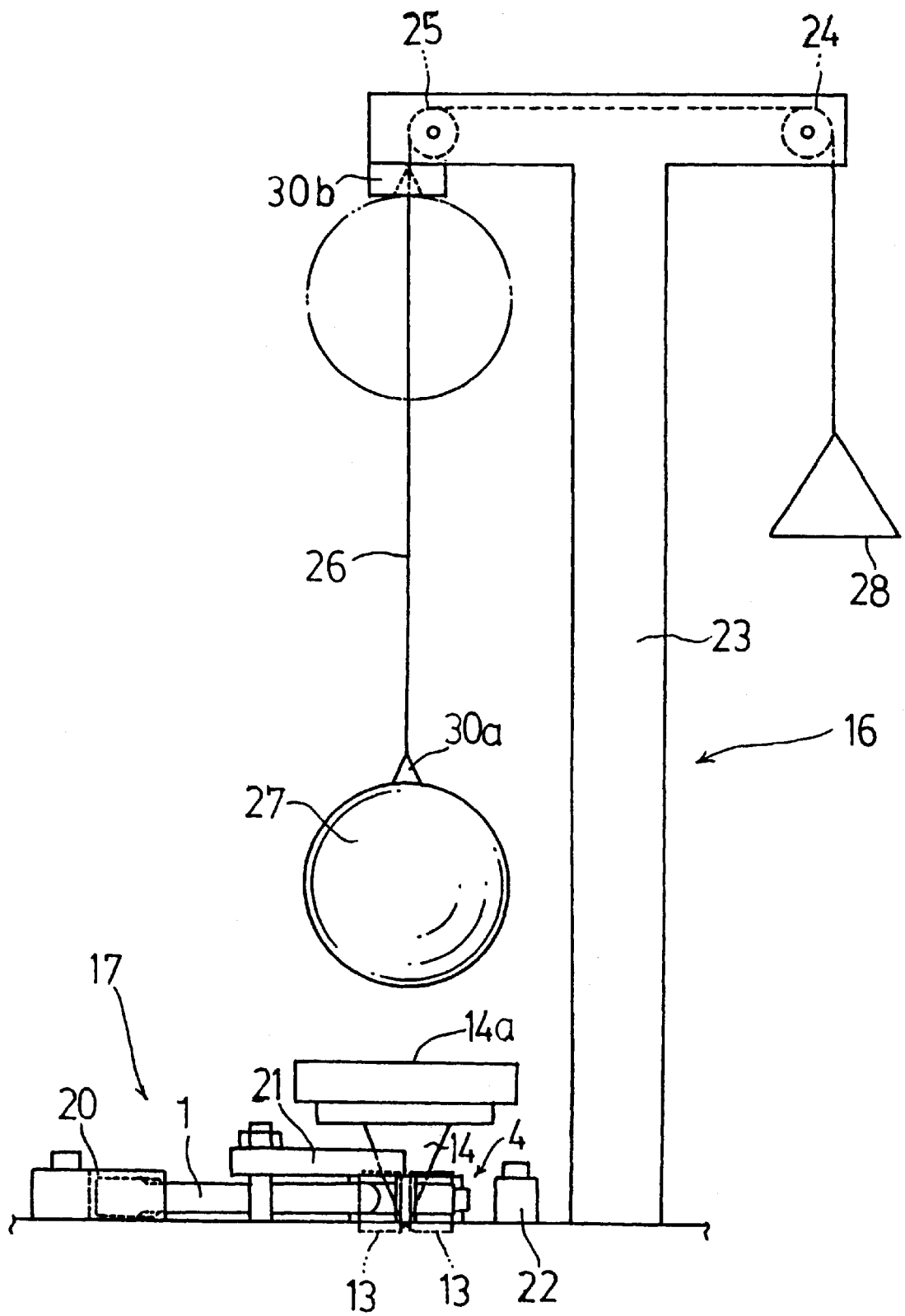
FIG. 11 is a side elevational view of an apparatus according to the present invention which applies an impact point load to a load bearing surface of a wedge.
Figure 12:
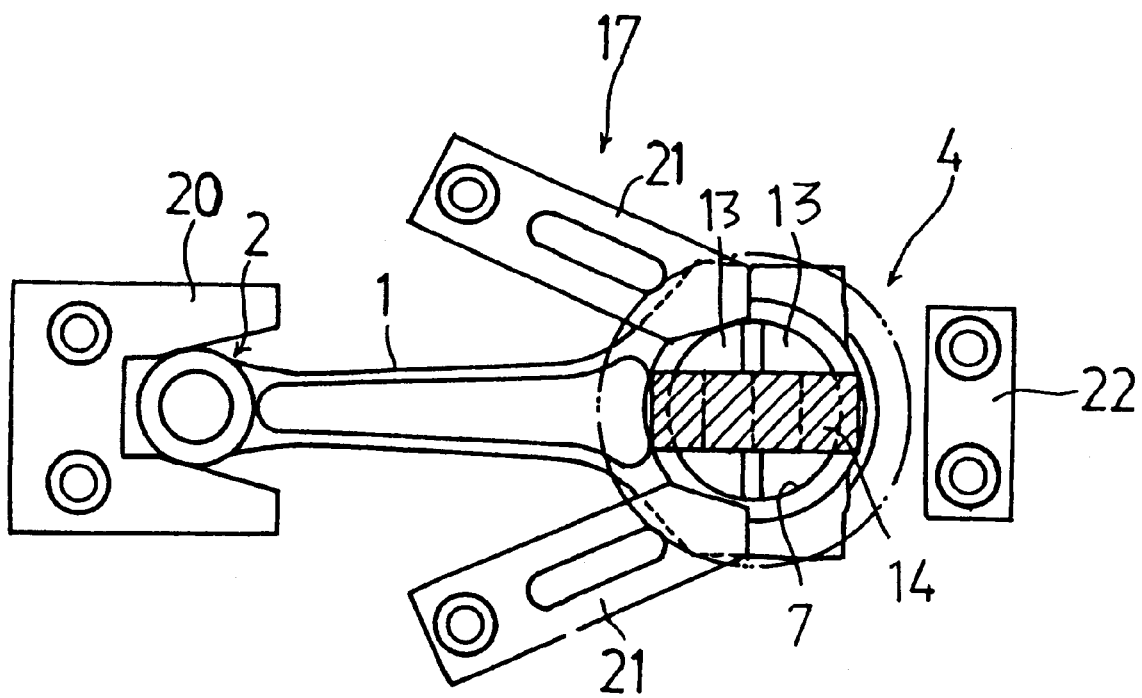
FIG. 12 is a plan view of a blank holder of the apparatus shown in FIG. 11.

According to the present invention, the method is carried out using an apparatus which comprises, as shown in FIG. 11, a load applying mechanism 16 and a blank holder 17 (see also FIG. 12). A cast-iron connecting rod blank is positioned by the blank holder 17, and the load applying mechanism 16 applies an impact point load to the center of the wedge 14 for spreading the spreading elements 13 inserted in the crank opening 7.

If the press which applies a load to the load bearing surface of the driver through surface-to-surface contact suffers an undue amount of play and hence a reduction in the accuracy of operation, then the press presses an end of the load bearing surface, increasing a nonuniform load imposed on the driver. However, when a point load is applied to the wedge 14, any nonuniform load imposed on the wedge 14 depends only on a positional error caused to the load applying mechanism 16, and results in reduced strains of the connecting rod blank when it is cracked. Furthermore, the roundness of the crank opening is increased by driving the wedge 14 with an impact point load that is greater than a certain level.

As shown in FIG. 12, the blank holder 17 comprises a smaller-diameter-end support block 20 for supporting the smaller-diameter end 2, a pair of support arms 21 for supporting the wedge 14 at the larger-diameter end 4, and a cap restraint 22 for preventing a separated cap from flying away. After the cast-iron connecting rod blank is set on the blank holder 17, the spreading elements 13 are inserted in the crank opening 7 in the larger-diameter end 4, and the lower tip end of the wedge 14 is inserted between the spreading elements 13. The wedge 14 is supported by the support arms 21 such that an upper load bearing surface 14a lies horizontally.

As shown in FIG. 11, the load applying mechanism 16 comprises a vertical post 23 disposed adjacent to the blank holder 17, a pair of pulleys 24, 25 rotatably supported on an upper end of the vertical post 23, a wire 26 trailed around the pulleys 24, 25, an iron ball 27 attached to an end of the wire 26, and a grip 28 attached to the other end of the wire 26. The iron ball 27 is positioned above the wedge 14 and has its center vertically aligned with the center of the wedge 14.

A ball positioner 30a is mounted on the upper end of the iron ball 27 which is joined to the wire 26. The ball positioner 30a can be fitted in a recess defined in a positioning block 30b mounted on the upper end of the vertical post 23 above the iron ball 27. The recess defined in the positioning block 30b has its center vertically aligned with the center of the wedge 14. When the iron ball 27 is lifted and the ball positioner 30a fits in the recess defined in the positioning block 30b, the iron ball 27 is positioned by the ball positioner 30a against unwanted wobbling movement.

In this embodiment, the iron ball 27 has a weight of about 10 kg, and the positioning block 30b on the vertical post 23 has a height of about 1 m.

The load applying mechanism 16 operates as follows: After the spreading elements 13 are placed in the crank opening 7 of the connecting rod blank and the wedge 14 is inserted and positioned between the spreading elements 13, the grip 28 is manually pulled to elevate the iron ball 27 until the ball positioner 30a fits in the recess in the positioning block 30b, as indicated by the dot-dot-and-dash lines, for thereby holding the iron ball 27 against unwanted wobbling movement. Then, the grip 28 is released, allowing the iron ball 27 to fall by gravity onto the load bearing surface 14a. The wedge 14 is now driven downwardly between the spreading elements 13, which are spread away from each other in the axial direction of the connecting rod blank. When the spreading elements 13 are forced outwardly away from each other, they crack the larger-diameter end 4 from the notches 12, splitting open the larger-diameter end 4 into the saddle 5 and the cap 6.

Since the load is applied from the iron ball 27 to the load bearing surface 14a through point-to-point contact, even if the iron ball 27 drops in a false position on the load bearing surface 14a due to an error, the iron ball 27 does not apply a substantial nonuniform load to the wedge 14, and hence does not impose undue strains on the larger-diameter end 4 as it is separated into the saddle 5 and the cap 6.

The impact energy applied by the iron ball 27 is selected to be at least a minimum amount of impact energy with which the target tolerance shown in FIG. 13 will be achieved. Therefore, the roundness of the crank opening 7 can be kept within the target tolerance. As a consequence, the crank opening 7 does not need to be further finished for a desired level of roundness after the larger-diameter end 4 is cracked into the saddle 5 and the cap 6.

The load applying mechanism 16 and the blank holder 17 shown in FIGS. 11 and 12 are relatively simple in structure, can be manufactured relatively inexpensively, and are resistant to failures.

Processes of producing a circular crank opening 7 of a connection rod 1 will be described below.

FIGS. 14(a) through 14(h) show successive steps of a conventional process of producing a circular crank opening 7 of a connection rod 1. According to the conventional process, the crank opening 7 is roughly machined for roundness as shown in FIG. 14(a), and then finished roundness as shown in FIG. 14(b). After notches 12 are formed in respective inner central wall regions of the larger-diameter end 4 in a transverse direction thereof as shown in FIG. 14(c), the larger-diameter end 4 is cracked from the notches 12 into a saddle 5 and a cap 6 under impact forces tending to spread the larger-diameter end 4 as shown in FIG. 14(d). Thereafter, as shown in FIG. 14(e), the saddle 5 and the cap 6 are temporarily put together and fastened to each other by bolts 31 which apply a fastening load to the saddle 5 and the cap 6. Under the applied fastening load, the crank opening 7 is deformed due to strains that occur to the saddle 5 and the cap 6 fastened by the bolts 31, as indicated by a diagram below the connecting rod 1 in FIG. 14(e). While the saddle 5 and the cap 6 are being fastened by the bolts 31, the crank opening 7 is finished for roundness as shown in FIG. 14(f). Thereafter, the bolts 31 are removed as shown in FIG. 14(g), and the shank with the saddle 5 and the cap 6 are delivered as separate parts to an engine assembling factory or the like.

In the engine assembling factory or the like, the saddle 5 and the cap 6 are fastened to each other again by bolts 31 with a crankshaft received in the crank opening 7, as shown in FIG. 14(h). Since the crank opening 7 has a desired degree of roundness, the crankshaft and the circular edge of the crank opening 7 do not suffer localized wear.

The crank opening 7 is finished for roundness before the larger-diameter end 4 is split open for the following reasons: If the crank opening 7 were not finished for roundness before the larger-diameter end 3 is split open, the circular edge of the crank opening 7 would have surface irregularities which would prevent uniform loads from being applied to spread the larger-diameter end 4 and would cause the larger-diameter end 4 to suffer strains which would prevent the saddle 5 and the cap 6 from being properly temporarily assembled together. Therefore, before the larger-diameter end 4 is split open, the crank opening 7 is finished for roundness in order to eliminate or minimize such strains.

According to the conventional process shown in FIGS. 14(a) through 14(h), however, the crank opening 7 needs to be finished for roundness before and after the larger-diameter end 4 is split open. Therefore, the conventional process has a relatively large number of steps and is poor in efficiency. Other drawbacks are that the mating surfaces of the saddle 5 and the cap 6 need to be accurately aligned with each other a plurality of times, and the saddle 5 and the cap 6 are required to be fastened together accurately a plurality of times. Consequently, the conventional process is comparatively complex and time-consuming to carry out.

FIGS. 15(a) through 15(g) show successive steps of a process of producing a circular crank opening of a connection rod according to the present invention. The process shown in FIGS. 15(a) through 15(g) is designed to be simpler and less time-consuming than the conventional process shown in FIGS. 14(a) through 14(h).

Figures 15A, 15B, 15C, 15D, 15E, 15F, 15G:
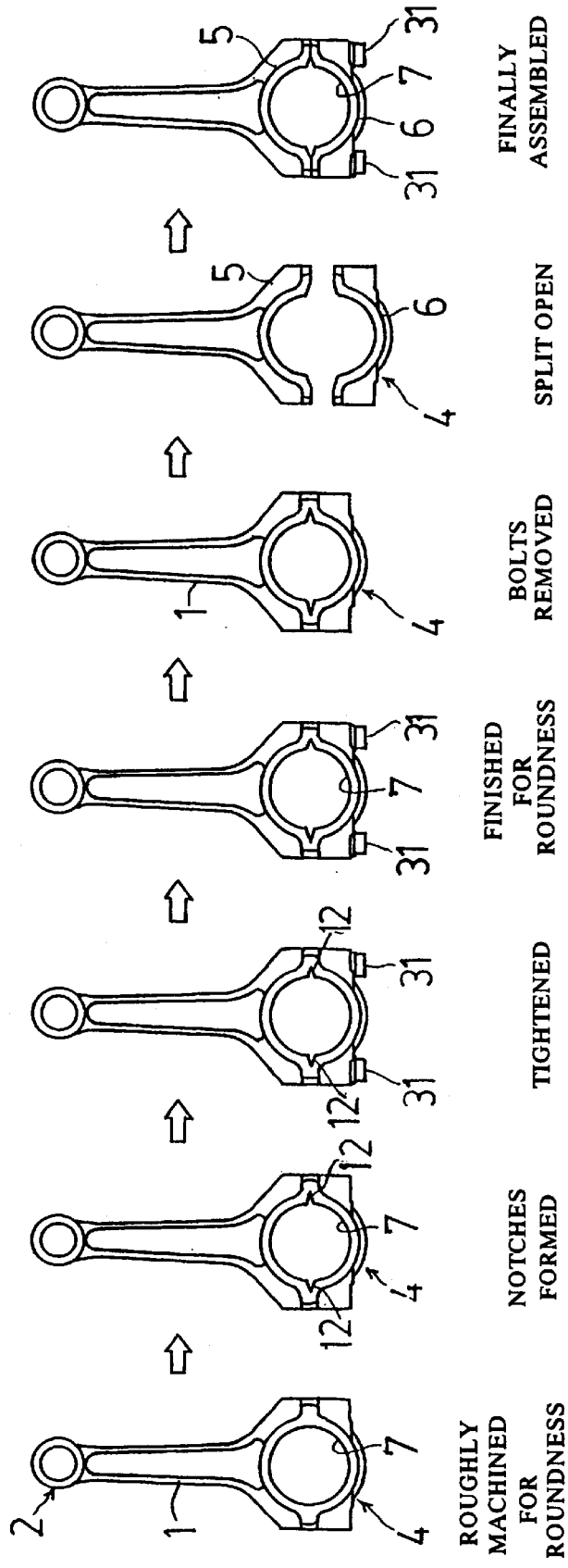
FIGS. 15(a) through 15(g) are views showing successive steps of a process of producing a circular crank opening of a connection rod according to the present invention.

According to the process shown in FIGS. 15(a) through 15(g), the crank opening 7 is roughly machined for roundness as shown in FIG. 15(a). After the crank opening 7 is roughly machined, it is substantially round as indicated by a diagram below the connecting rod 1 in FIG. 15(a).

Then, as shown in FIG. 15(b), notches 12 are formed transversely across inner central wall regions of the larger-diameter end 4. The notches 12 may be formed by a wire cutting process, an ordinary machining process, a laser beam process, or the like. If the connecting rod blank comprises an iron casting, the notches 12 should preferably be formed by a laser beam process.

Thereafter, the larger-diameter end 4 is tightened by bolts 31 inserted through respective bolt holes defined in opposite sides of the larger-diameter end 4, as shown in FIG. 15(c). In this embodiment, the bolt holes are internally threaded at ends thereof by a tapping process or the like, and the bolts 31 are threaded into the internally threaded ends of the bolt holes with such a torque which will produce a load that is the same as a fastening load by which a saddle 5 and a cap 6 will later be fastened by bolts.

When the larger-diameter end 4 is tightened by the bolts 31, the circular crank opening 7 is deformed under the applied load as indicated by a diagram below the connecting rod 1 in FIG. 15(c).

Then, as shown in FIG. 15(d), the crank opening 7 is finished for roundness. Thereafter, the bolts 31 are removed as shown in FIG. 15(e), and the larger-diameter end 4 is cracked from the notches 12 into a saddle 5 and a cap 6 under impact forces as shown in FIG. 15(f).

If the connecting rod 1 comprises an iron casting and the notches 12 are formed by a laser beam, then since the metal structure around the notches 12 is brittle cementite, the larger-diameter end 4 is cracked neatly into the saddle 5 and the cap 6 without any substantial strains caused to the saddle 5 and the cap 6.

After the larger-diameter end 4 is divided into the saddle 5 and the cap 6, the shank with the saddle 5 and the cap 6 are delivered as separate parts to an engine assembling factory or the like.

In the engine assembling factory or the like, the saddle 5 and the cap 6 are fastened to each other again by the bolts 31 with a crankshaft received in the crank opening 7, as shown in FIG. 15(g). After the saddle 5 and the cap 6 are fastened by the bolts 31, the crank opening 7 retains a desired degree of roundness.

The process shown in FIGS. 15(a) through 15(g) is simpler than the conventional process shown in FIGS. 14(a) through 14(h) which includes the extra step of finishing the crank opening 7 for roundness before the larger-diameter end 4 is divided into the saddle 5 and the cap 6.

Another process of producing a circular crank opening of a connection rod will be described below with reference to FIGS. 16 and 17(a) through 17(g). This process employs a workpiece clamping jig 32 shown in FIG. 16, which is used to apply a load to the larger-diameter end 4 that is the same as a fastening load by which a saddle 5 and a cap 6 will later be fastened by bolts, and also to hold the larger-diameter end 4 while the crank opening 7 is being finished for roundness.

Figure 16:
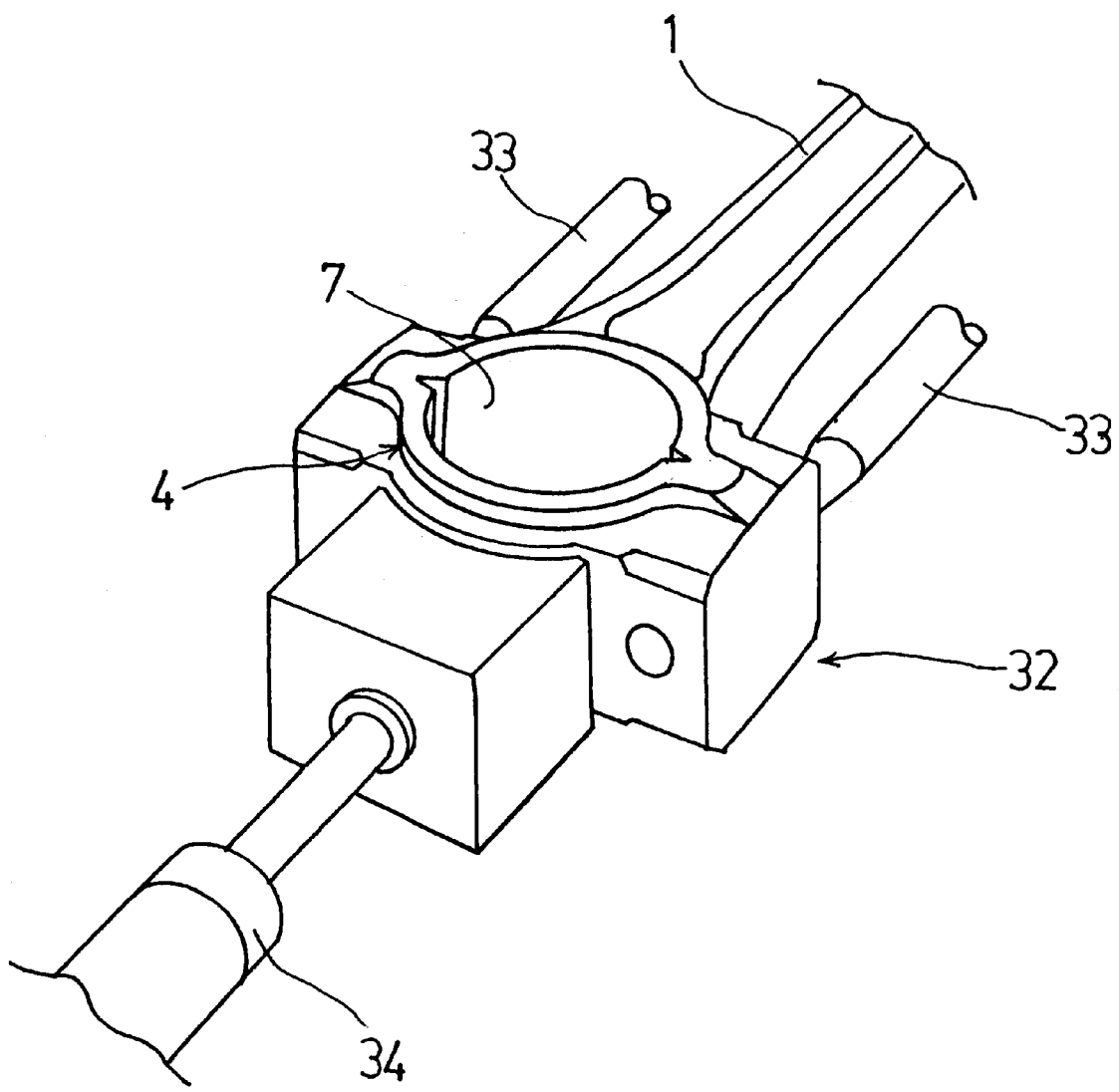
FIG. 16 is a fragmentary perspective view of a workpiece clamping jig for use in a process of producing a circular crank opening.

As shown in FIG. 16, the workpiece clamping jig 32 serves to position the connecting rod blank and apply an axial load to the larger-diameter end 4 of the connecting rod blank. The workpiece clamping jig 32 comprises a pair of parallel positioning bars 33 inserted partly in ends of the respective bolt holes defined in the sides of the larger-diameter end 4, for positioning the connecting rod blank and holding the larger-diameter end 4 against axial movement, and a pressing cylinder unit 34 for pressing the larger-diameter end 4 against the positioning bars 33. The positioning bars 33 and the pressing cylinder unit 34 jointly apply an axial compressive load to the larger-diameter end 4.

The process shown in FIGS. 17(a) through 17(g) will be described below. The process has steps shown in FIGS. 17(a), 17(b), 17(f), 17(g) which are identical to the steps shown in FIGS. 15(a), 15(b), 15(f), 15(g) and will not be described in detail below.

As shown in FIG. 17(c), the connecting rod blank is set in the workpiece clamping jig 32, and the pressing cylinder unit 34 is actuated to press the larger-diameter end 4 against the positioning bars 33 under the same load as a fastening load by which a saddle 5 and a cap 6 will later be fastened by bolts. Then, the crank opening 7 is finished for roundness as shown in FIG. 17(d).

After the crank opening 7 is finished for roundness, the pressing cylinder unit 34 is retracted to release the larger-diameter end 4, as shown in FIG. 17(e).

Since the workpiece clamping jig 32 is used to load the larger-diameter end 4, it is not necessary to load the larger-diameter end 4 with the bolts 31 while the crank opening 7 is finished for roundness. Therefore, the process shown in FIGS. 17(a) through 17(g) is simpler, less time-consuming, and less expensive than the process shown in FIGS. 15(a) through 15(g).

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A method of manufacturing a connecting rod, comprising the steps of:

preparing an integral cast-iron connecting rod blank having a smaller-diameter end, a shank, and a larger-diameter end, said larger-diameter end having a crank opening for receiving a crankshaft therein;

applying a laser beam to opposite inner central wall regions of said larger-diameter end across the crank opening to form notches along the opposite inner central wall regions transversely of the integral cast-iron connecting rod blank, said notches having different shapes, respectively, as viewed from within the crank opening; and applying forces to said larger-diameter end in a direction to spread the larger-diameter end to develop a crack radially from said notches in the larger-diameter end for thereby dividing the larger-diameter end into a saddle and a cap.

2. A method according to claim 1, wherein at least one of said notches is of a zigzag shape as viewed from within the crank opening.

3. A method according to claim 1, wherein said laser beam is applied at different angles respectively to the opposite inner central wall regions of said larger-diameter end.

4. A method of manufacturing a connecting rod, comprising the steps of:

preparing an integral connecting rod blank having a smaller-diameter end, a shank, and a larger-diameter end, said larger-diameter end having a crank opening for receiving a crankshaft therein;

forming notches in opposite inner central wall regions of said larger-diameter end across the crank opening transversely of the integral connecting rod blank;

inserting a pair of spreading elements in said crank opening;

applying an impact point load to a central area of a wedge to drive said wedge between said spreading elements to spread said larger-diameter end radially outwardly for thereby dividing the larger-diameter end into a saddle and a cap.

5. A method according to claim 4, wherein said step of applying an impact point load comprises the steps of holding a load bearing surface of said wedge horizontally and dropping a spherical object from above the central area of the wedge downwardly onto said load bearing surface of the wedge for thereby applying the impact point load to the central area of the wedge.

6. A method according to claim 4, wherein said integral connecting rod blank comprises an iron casting, and said step of forming notches comprises the step of applying a laser beam to the opposite inner central wall regions of said larger-diameter end.

7. A method of manufacturing a connecting rod, comprising the steps of:

preparing an integral connecting rod blank having a smaller-diameter end, a shank, and a larger-diameter end, said larger-diameter end having a crank opening for receiving a crankshaft therein;

forming notches in opposite inner central wall regions of said larger-diameter end across the crank opening transversely of the integral connecting rod blank;

finishing the crank opening for roundness while said larger-diameter end is being subjected to a load which is the same as a fastening load by which a saddle and a cap divided from said larger-diameter end will be fastened to each other; and thereafter, applying forces to said larger-diameter end in a direction to spread the larger-diameter end to develop a crack radially from said notches in the larger-diameter end for thereby dividing the larger-diameter end into said saddle and said cap.

8. A method according to claim 7, wherein said larger-diameter end is being subjected to said load by a workpiece clamping jig which is used to clamp said larger-diameter end when finishing the crank opening for roundness.

9. A method according to claim 7, wherein said integral connecting rod blank comprises an iron casting, and said step of forming notches comprises the step of applying a laser beam the opposite inner central wall regions of said larger-diameter end.

* * * * *